United States Patent
Bidmead

(10) Patent No.: US 12,352,577 B2
(45) Date of Patent: Jul. 8, 2025

(54) MONITORING A SPEED DETERMINATION SYSTEM

(71) Applicant: AIRBUS OPERATIONS LIMITED, Bristol (GB)

(72) Inventor: Ashley Bidmead, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 395 days.

(21) Appl. No.: 17/786,233

(22) PCT Filed: Dec. 15, 2020

(86) PCT No.: PCT/EP2020/086106
§ 371 (c)(1),
(2) Date: Jun. 16, 2022

(87) PCT Pub. No.: WO2021/122517
PCT Pub. Date: Jun. 24, 2021

(65) Prior Publication Data
US 2023/0023732 A1   Jan. 26, 2023

(30) Foreign Application Priority Data
Dec. 18, 2019 (GB) .................................. 1918771

(51) Int. Cl.
*G01C 21/16* (2006.01)
(52) U.S. Cl.
CPC ......... *G01C 21/183* (2020.08); *G01C 21/165* (2013.01)
(58) Field of Classification Search
CPC ... G01C 21/183; G01C 21/165; G01S 19/396; G01S 19/15; G01S 19/49; G01S 19/52;
(Continued)

(56) References Cited

U.S. PATENT DOCUMENTS 5,923,286 A   7/1999   Divakaruni
6,408,245 B1  6/2002   An et al.
(Continued)

OTHER PUBLICATIONS

International Search Report for PCT/EP2020/086106 dated Feb. 16, 2021, 5 pages.
(Continued)

*Primary Examiner* — Mi'schita' Henson
(74) *Attorney, Agent, or Firm* — Nixon & Vanderhye P.C.

(57) ABSTRACT

A monitoring system for a speed determination system in an aircraft is disclosed. A method, which may be implemented by a computer program, of monitoring a speed determination system for an aircraft is also disclosed. The speed determination system includes a first speed measurement system and a second speed measurement system and the second speed measurement system is associated with a predetermined behaviour characteristic. The monitoring system includes a processor arranged to receive speed data provided by the speed determination system and to perform a correspondence determination process comprising processing the received speed data to determine whether a correspondence condition is satisfied, the correspondence condition having a correspondence between the received speed data and the predetermined behaviour characteristic of the second speed measurement system. In response to determining that the correspondence condition is satisfied, determine that the first speed measurement system is in an error condition.

14 Claims, 6 Drawing Sheets

(58) Field of Classification Search
CPC . G01P 7/00; G01P 21/02; B64D 45/00; B64F 5/60
See application file for complete search history.

(56) References Cited

U.S. PATENT DOCUMENTS

| | | | | |
|---|---|---|---|---|
| 8,560,218 | B1* | 10/2013 | Kahn | G01S 19/49 |
| | | | | 701/472 |
| 2002/0019701 | A1 | 2/2002 | Miller | |
| 2010/0103033 | A1* | 4/2010 | Roh | G01S 19/40 |
| | | | | 342/357.32 |
| 2014/0324300 | A1* | 10/2014 | Halder | G01S 19/49 |
| | | | | 701/50 |
| 2018/0284778 | A1* | 10/2018 | Worsham, II | G01S 5/017 |
| 2020/0361627 | A1* | 11/2020 | Schwartz | B64D 45/00 |
| 2023/0030332 | A1* | 2/2023 | Carcanague | G01S 19/52 |

OTHER PUBLICATIONS

Written Opinion of the ISA for PCT/EP2020/086106 dated Feb. 16, 2021, 8 pages.

* cited by examiner

200

202

Receive speed data provided by the speed determination system

204

Perform a correspondence determination process comprising processing the received speed data to determine whether a correspondence condition is satisfied, the correspondence condition comprising a correspondence between the received speed data and the predetermined behaviour characteristic of the second speed measurement system

206

In response to determining that the correspondence condition is satisfied determining that the first speed measurement system is in an error condition

MONITORING A SPEED DETERMINATION SYSTEM

CROSS REFERENCE TO RELATED APPLICATIONS

The present application is a National Phase of International Application Number PCT/EP2020/086106 filed Dec. 15, 2020, which designated the U.S. and claims priority benefits from Great Britain Patent Application Number GB1918771.5, filed Dec. 18, 2019, the entire contents of each of which are hereby incorporated by reference.

TECHNICAL FIELD

The present invention relates to a monitoring system for monitoring a speed determination system for an aircraft, a method of monitoring a speed determination system for an aircraft and a computer program for monitoring a speed determination system of an aircraft.

BACKGROUND

Many systems on modern aircraft, particularly those that provide control over aircraft position and/or trajectory, utilise speed data. During flight, speed data that may be utilised include, for example, an indicated airspeed (IAS), a calibrated airspeed (CAS), an equivalent airspeed (EAS), and a true airspeed (TAS). However, during ground manoeuvres, it is common to use a speed value which accurately indicates the speed of the aircraft relative to the ground, referred to hereinafter as groundspeed.

Modern aircraft typically have multiple systems for determining groundspeed. The most accurate groundspeed measurements may be provided by global positioning system (GPS) data.

However, in some circumstances, while aircraft are manoeuvring around an airfield, particularly in larger airports in which there are multiple large buildings, GPS signals may be temporarily lost or may otherwise become unreliable. In such circumstances, speed values determined on the basis of GPS may accordingly become unreliable. Accordingly, modern aircraft have backup systems for determining groundspeed.

One such system is an inertial reference system (IRS). An IRS determines speed by integrating acceleration values provided by an accelerometer. Another such system is a wheel speed system that determines the groundspeed based on a frequency of rotation of one or more wheels of the undercarriage of the aircraft. However, each of these systems may be less accurate than systems that utilising GPS data. Therefore, it is useful to be able to determine when speed data determined on the basis of GPS data becomes unreliable.

The present invention mitigates the above-mentioned problems and accordingly may provide a more reliable speed measurement system.

SUMMARY

A first aspect of the present invention provides a monitoring system for a speed determination system in an aircraft, the speed determination system comprising a first speed measurement system and a second speed measurement system, the second speed measurement system being associated with a predetermined behaviour characteristic, the monitoring system comprising a processor arranged to: receive speed data provided by the speed determination system; perform a correspondence determination process comprising processing the received speed data to determine whether a correspondence condition is satisfied, the correspondence condition comprising a correspondence between the received speed data and the predetermined behaviour characteristic of the second speed measurement system; and in response to determining that the correspondence condition is satisfied, determine that the first speed measurement system is in an error condition.

Optionally, the first speed measurement system is arranged to determine a time-varying speed measurement based on global positioning system data.

Optionally, the second speed measurement system is arranged to determine a time-varying speed measurement based on accelerometer data.

Optionally, the second speed measurement system comprises an integrator and the predetermined behaviour characteristic comprises an error value that is amplified over time by the integrator.

Optionally, the monitoring system is arranged to monitor the predetermined behaviour characteristic to determine whether the behaviour characteristic corresponds with a behaviour characteristic exhibiting amplification.

Optionally, the predetermined behaviour characteristic of the second speed measurement system comprises a first value, the first value being a value of a rate of change of acceleration, and the correspondence determination process comprises: determining a second value, the second value being a value of a rate of change of acceleration indicated by the received speed data, and wherein the correspondence condition comprises a correspondence between the second value and the first value.

Optionally, the correspondence condition comprises that the second value lies within a predetermined range, the predetermined range including the first value.

Optionally, the first value is 2.

A second aspect of the present invention provides a method of monitoring a speed determination system for an aircraft, the speed determination system being configured to determine the speed of an aircraft based on time-varying data provided by a plurality of speed measurement systems including a first speed measurement system and a second speed measurement system, the second speed measurement system being associated with a predetermined behaviour characteristic, the method comprising: receiving speed data provided by the speed determination system; performing a correspondence determination process comprising processing the received speed data to determine whether a correspondence condition is satisfied, the correspondence condition comprising a correspondence between the received speed data and the predetermined behaviour characteristic of the second speed measurement system; and in response to determining that the correspondence condition is satisfied determining that the first speed measurement system is in an error condition.

Optionally, the predetermined behaviour characteristic of the second speed measurement system comprises a first value, the first value being a value of a rate of change of acceleration, and the correspondence determination process comprises: determining a second value, the second value being a value of a rate of change of acceleration indicated by the received speed data, and wherein the correspondence condition comprises a correspondence between the second value and the first value.

Optionally, the correspondence condition comprises that the second value lies within a predetermined range, the predetermined range including the first value.

Optionally, the first value is 2.

Optionally, the speed data indicates a series of speed values corresponding to a respective series of time intervals, and the correspondence condition comprises that a correspondence between the first value and the second value persists over at least a predetermined number of the time intervals.

Optionally, the predetermined number of time intervals is greater than or equal to five.

Optionally, a duration of the time intervals is less than or equal to 200 ms.

Optionally, the first speed measurement system is arranged to determine a time-varying speed measurement based on global positioning system data and the second speed measurement system is arranged to determine a time-varying speed measurement based on accelerometer data, and wherein the speed determination system is arranged to provide speed data based on the first speed measurement system when the first measurement system is not in an error condition.

Optionally, the method comprises: in response to determining that the first speed measurement system is not in an error condition, determining a speed of the aircraft from the first speed data and determining one or more correction values for the second speed measurement system; and in response to determining that the first speed measurement system is in an error condition, determining a speed of the aircraft from the second speed data and the determined one or more correction values.

According to a third aspect of the present invention, there is provided an aircraft comprising a monitoring system according to the first aspect.

According to a fourth aspect of the present invention there is provided a computer program which, when executed by a processor in a speed determination system for an aircraft, the speed determination system being configured to determine the speed of an aircraft based on time-varying data provided by a plurality of speed measurement systems including a first speed measurement system and a second speed measurement system, the second speed measurement system being associated with a predetermined behaviour characteristic, causes the processor to: receive speed data provided by the speed determination system; perform a correspondence determination process comprising processing the received speed data to determine whether a correspondence condition is satisfied, the correspondence condition comprising a correspondence between the received speed data and the predetermined behaviour characteristic of the second speed measurement system; and in response to determining that the correspondence condition is satisfied, determine that the first speed measurement system is in an error condition.

BRIEF DESCRIPTION OF THE DRAWINGS

Embodiments of the invention will now be described, by way of example only, with reference to the accompanying drawings, in which:

FIG. 2 is a schematic diagram illustrating the operation of a speed determination system according to an example;

DETAILED DESCRIPTION

Figure 1A:
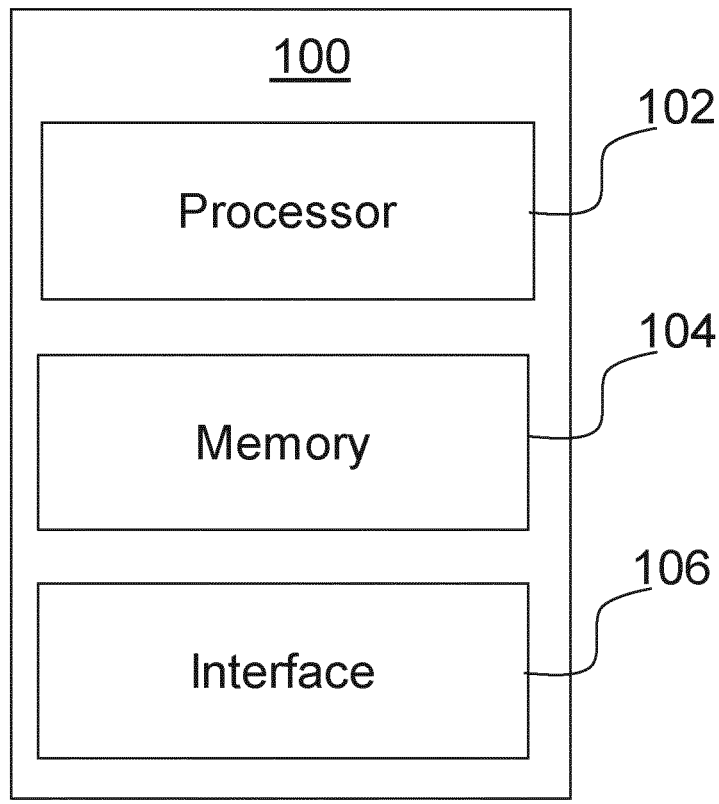
FIG. 1a is schematic diagram illustrating a monitoring system for a speed determination system according to an example.

FIG. 1a is schematic diagram of a monitoring system 100 for a speed determination system for an aircraft, according to an example.

In the example shown in FIG. 1a, the monitoring system 100 is a computerized device implemented by a processor 102 executing software instructions stored in a memory 104 on the basis of inputs received via an interface 106. For example, the monitoring system 100 may be an avionics unit installed in an aircraft such as the aircraft 500 described below with reference to FIG. 5.

The memory 104 may also store behaviour characteristics of one or more speed measurement systems as described below in relation to the example described with reference to FIG. 3.

The interface 106 is arranged to receive data including speed data from a speed determination system.

The interface 106 is also arranged to output an error signal indicating that the speed determination system is in an error condition or state. For example, the interface 106 may provide a signal indicating that one or more speed measurement systems comprising the speed determination system is not operating correctly. This may mean that data from the incorrectly operating speed measurement system is unreliable and should therefore be ignored or discounted by the speed determination system. Such information may, for example, be used to provide a speed indication (for example via a speed indication display in the cockpit) or may be used by other aircraft systems that use speed data provided by the speed determination system. In other examples, data provided to the monitoring system may be provided to other aircraft systems that use the same sources of data used by the speed determination system to determine the aircraft speed, and the monitoring system may provide information regarding the validity of that information to such systems.

The error signal output from the interface 106 may be provided to these other systems which, in response may determine to use a different speed measurement system to the speed measurement system giving rise to the error condition.

The inputs received at the interface 106 may correspond to speed data received from one or more speed measurement systems including a first speed measurement system arranged to provide first speed data and a second speed measurement system arranged to provide second speed data, as described below with reference to FIG. 4. The first speed measurement system is arranged to provide the first speed data based on a first speed measurement and the second speed measurement system is arranged to provide the second speed data based on a second speed measurement. The second speed measurement system is associated with a predetermined behaviour characteristic such as that described below with reference to FIG. 3.

Although, in the example shown in FIG. 1a, the monitoring system 100 is implemented in software executed by hardware (processor 102) in some examples, the monitoring system 100 may be implemented entirely in hardware.

Figure 1B:
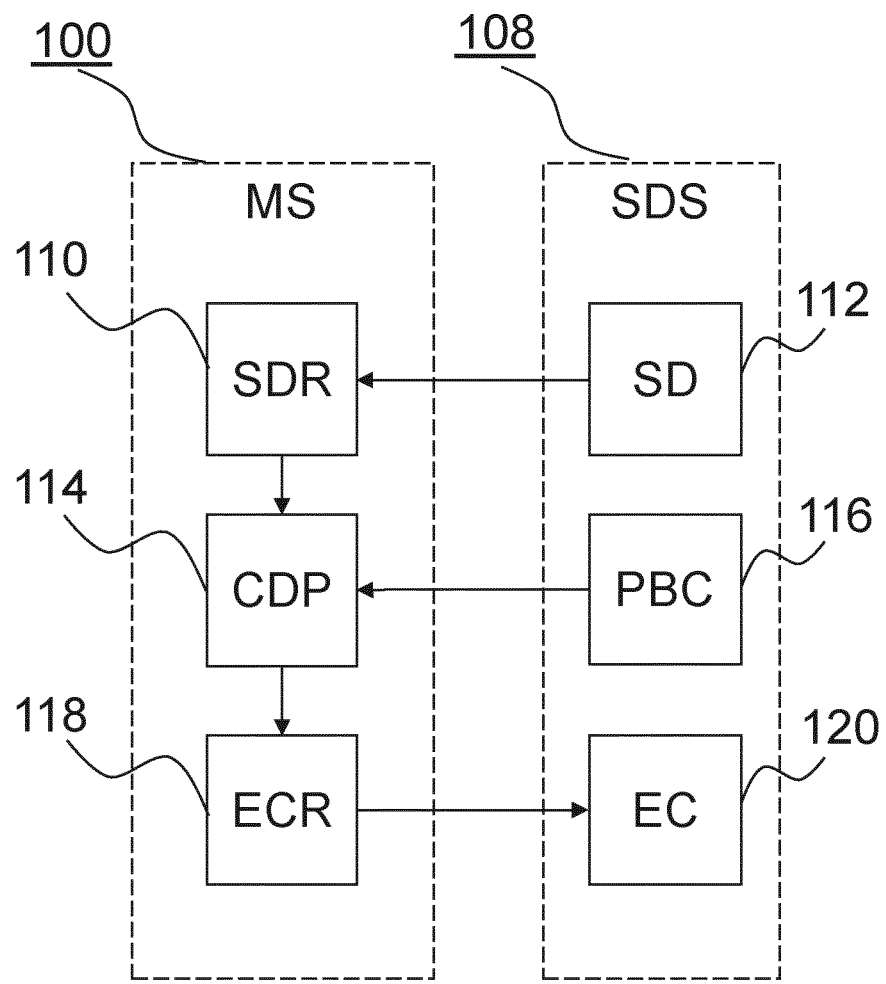
FIG. 1b is a schematic diagram illustrating the operation of a processor arranged to monitor a speed determination system according to an example.

FIG. 1b is a schematic diagram illustrating an interaction between a monitoring system (MS) 100 as described above with reference to FIG. 1a and a speed determination system (SDS) 108 for an aircraft, according to an example. The speed determination system 108 may, for example, be as described below with reference to FIG. 4.

As shown in FIG. 1b, the processor 102 implements a speed data receipt (SDR) function 110, which receives speed data (SD) 112. For example, the SDR function 110 may receive speed data 112, provided by one or more speed measurement systems of the speed determination system 108, via the interface 106 of the monitoring system 100.

The monitoring system 100 comprises a correspondence determination process (CDP) function 114, arranged to receive speed data 112 (for example from the SDR function 110, or directly from the SDS 108) and to receive a predetermined behaviour characteristic (PBC) 116. The PBC 116 is a predetermined behaviour characteristic of the second speed measurement system. Specifically, the CDP function 114 performs a correspondence determination process comprising processing the received speed data 112 to determine whether a correspondence condition is satisfied. The correspondence condition is satisfied, for example, when there is a correspondence between the received speed data 112 and the predetermined behaviour characteristic 116 of the second speed measurement system.

In response to the CDP 114 determining that the correspondence condition is satisfied (that is, that in response to determining that there is a correspondence between the speed data 112 and the predetermined behaviour characteristic 116 of the second speed measurement system), an error condition recognition (ECR) function 118 is arranged to determine that the first speed measurement system is in an error condition (EC) 120. The ECR 118 may be arranged, as shown in FIG. 1b, to provide a signal indicating the error condition 120 to the speed determination system 108.

FIG. 2 is a flow diagram illustrating a method 200 of monitoring a speed determination system of an aircraft. For example, the method 200 may operate under the control of the monitoring system 100 described above with reference to FIGS. 1a and 1b.

At block 202 speed data, such as the speed data 112 data provided by the speed determination system 108 described above with reference to FIG. 1b is received. For example, the speed data may be received by the SDR described above with reference to FIG. 1b. The speed data may include speed data from a first speed measurement system and from a second speed measurement system. As described below with reference to FIG. 4 below, the first speed measurement system may determine a speed measurement based on GPS data and the second speed measurement system may determine speed based on IRS data; however, one or both of the first and second speed measurement systems may determine a speed measurement based on different speed measurement techniques.

At block 204, a correspondence determination process comprising processing the received speed data to determine whether a correspondence condition is satisfied is performed. The correspondence determination process may be performed by the CDP function 114 described above with reference to FIG. 1b, for example. The correspondence condition comprises a correspondence between the received speed data and the predetermined behaviour characteristic of the second speed measurement system. For example, the speed data received from the speed determination system 108 includes speed data generate by or provided by the first speed measurement system (which may correspond, for example, to a speed measurement generate based on GPS data) and the second speed measurement system (which may generate speed values based on data not utilising GPS, such as inertial reference data determined based on values generated by an accelerometer in the aircraft and/or wheel speed data determined based on values generated based on a frequency of rotation of one or more wheels of the aircraft).

At block 206, a determination that the first speed measurement system is in an error condition is made in response to determining that the correspondence condition is satisfied. Such a determination may be made, for example, by the ECR 118 described above with reference to FIG. 1b.

For example, in response to determining that the correspondence condition is satisfied, the monitoring system 100 may determine that the first speed measurement system is in an error condition because the speed determined by the speed determination system 108 has a characteristic similar to or the same as that which would be expected if the speed determined by the speed determination system 100 was determining a speed measurement based on a measurement provided by the second speed measurement system alone.

As described above, the memory 104 of the monitoring system 100 may store predetermined behaviour characteristics of one or more speed measurement systems 116. For example, each speed measurement system from which the speed determination system can obtain speed data may have an associated predetermined behaviour characteristic 116 that is stored in the memory 104, which the monitoring system can retrieve from the memory 104 to perform the correspondence determination process described above with reference to block 204 of the method 200 of FIG. 2. That is, the monitoring system 100 may monitor speed data 112 determined by a speed determination system 108 to determine whether that speed data 112 has a characteristic corresponding with a predetermined behaviour characteristic 116 stored in the memory 104.

If the monitoring system 100 determines that there is a correspondence between speed data 112 determined by a speed determination system 108 and one or more of the predetermined behaviour characteristics 116 stored in the memory 104 (i.e. characteristics relating to a second speed measurement system), the monitoring system 100 may determine that there is an error in the speed data 112 provided by a first measurement system 108.

Figure 3:
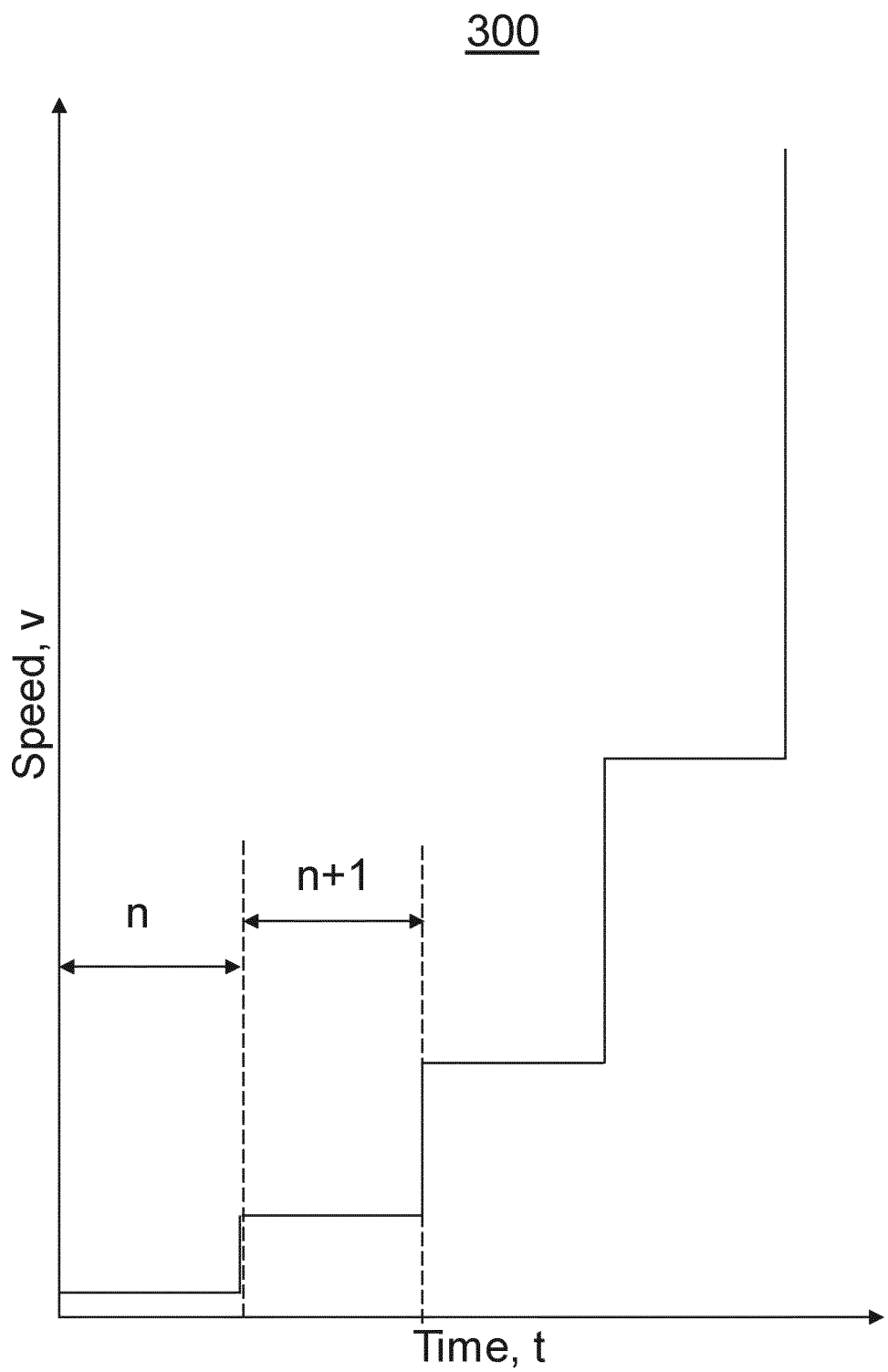
FIG. 3 is a flow diagram illustrating a method of monitoring a speed determination system of an aircraft according to an example.

FIG. 3 is a graph showing an illustrative example of a behaviour characteristic 300 which may correspond with a second speed measurement system. In the example shown in FIG. 3, the behaviour characteristic relates to a speed measurement system arranged to measure a speed of the aircraft based on values determined from an accelerometer. The monitoring system may receive speed data (e.g. the speed data 112) and using, for example, the correspondence determination function 114, may determine a correspondence between the speed data 112 and a predetermined behaviour characteristic 116.

For example, the speed determined by the speed determination system may utilise speed data from a first speed measurement system (for example a GPS system) and a second speed measurement system (for example, an IRS system), which may be compared with a predetermined behaviour characteristic associated with the second speed measurement system, to determine an error condition of the first speed measurement system.

The predetermined behaviour characteristic 300 shown in FIG. 3 comprises a series of speed values corresponding to a respective series of time intervals, n. A duration of each of the time intervals may be equal. For example, the duration of each of the time intervals may be less than or equal to 200 ms.

In the example shown in FIG. 3, the predetermined behaviour characteristic 300 is that a rate of change of speed doubles every speed interval. That is, for a time interval, n:

$$2 \times \frac{dv}{dt_n} \approx \frac{dv}{dt_{n+1}}$$

where v is a speed of the aircraft determined by the speed determined by the speed determination system in a given time interval $t_n$, such that $$\frac{dv}{dt_n}$$

is a rate of change of speed of the aircraft in time interval n, and $$\frac{dv}{dt_{n+1}}$$

is a rate of change of speed of the aircraft in time interval n+1.

That is, the rate of change of acceleration is constant, with a constant of proportionality approximately equal to 2.

Accordingly, if the correspondence determination process 114 of the monitoring system 100 determines that received speed data 112 corresponds with a predetermined behaviour characteristic 116 such as that shown in FIG. 3 (i.e. that the rate of change of acceleration is approximately constant), the monitoring system 100 may determine that the received speed data 112 is characteristic of speed data from a speed measurement system arranged to determine speed based on values generated by an accelerometer, and in turn infer that expected data from a primary or first speed measurement system that would be used in preference to speed values determined based on accelerometer data (e.g. GPS data) is unavailable or unreliable, to determine an error condition of the first speed measurement system.

In some examples, the predetermined behaviour characteristic 116 against which the rate of change of speed determined by the speed determination system is processed comprises a first value, which is a first rate of change of acceleration. In such examples, the correspondence determination process may comprise determining a second value (that is a second rate of change of acceleration indicated by the received speed data), and the correspondence condition may be determined if there is a correspondence between the second rate of change of acceleration (second value) and the first rate of change of acceleration (first value).

In some examples, the correspondence may be determined if the second value is within a predetermined range of rates of change of acceleration that includes the first value. For example, the correspondence may be determined if the second value is within, for example, ±5% of the first value.

In some examples, the correspondence condition may be that there is a correspondence between the first value and the second value persists over at least a predetermined number of the time intervals. For example, the correspondence condition may be that there is a correspondence between the first value and the second value for at least five time intervals.

In some examples, the first speed measurement system is arranged to determine a time-varying speed measurement based on global positioning system data and the second speed measurement system is arranged to determine a time-varying speed measurement based on accelerometer data, and the speed determination system is arranged to provide speed data based on the first speed measurement system when the first measurement system is not in an error condition. For example, in response to determining that the first speed measurement system (i.e. the GPS system) is not in an error condition, a speed of the aircraft and/or one or more correction values for the second speed measurement system may be determined from a speed measurement from the first speed measurement system and in response to determining that the first speed measurement system is in an error condition, a speed of the aircraft and one or more correction values may be determined from the second speed data.

Figure 4:
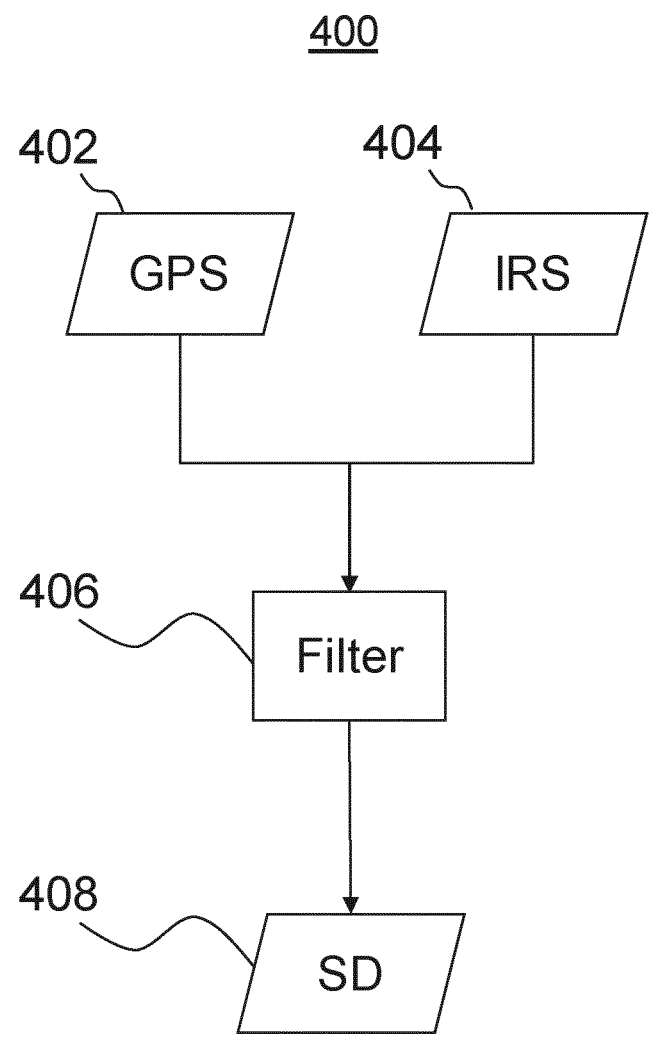
FIG. 4 is a graph showing a predetermined behaviour characteristic according to an example.

For example, FIG. 4 is a schematic diagram illustrating the operation of a speed determination system 400 which is an example of the speed determination system 108 described above with reference to FIG. 1b. In this example, the speed determination system 108 is arranged to determine a speed value based on data provided by two speed measurement systems: a first speed measurement system which is a global positioning system (GPS) 402, and a second speed measurement system which is an inertial reference system (IRS) 404.

The GPS system 402 uses global positioning data received from global positioning satellites to determine a position of the aircraft and determines a measure of the speed of the aircraft based on a rate of change of position of the aircraft. The accuracy of the determined position of the aircraft and therefore the accuracy of the speed of the aircraft determined by the GPS system 402 is related to the number of satellites from which the GPS system 402 can receive positioning data.

In some circumstances, such as when the aircraft is near large buildings, GPS signals may be temporarily lost or may otherwise become unreliable. In such circumstances, speed values determined on the basis of GPS data may accordingly become unreliable. In such circumstances, the speed determination system 400 shown in FIG. 4 can determine the speed of the aircraft based on the second speed measurement system, the IRS 404.

The IRS 404 may determine speed by integrating acceleration values provided by one or more accelerometers located within the aircraft. The accelerometers may be calibrated (e.g. "zeroed") while the aircraft is stationary and may measure the acceleration of the aircraft over time. By integrating values of acceleration, the IRS 404 determines a value corresponding to the speed of the aircraft. However, because errors in the determined acceleration values accumulate, over time speed values determined by the IRS 404 may become less accurate and are typically less accurate than the GPS 402.

The speed determination system shown in FIG. 4 comprises a filter 406 which is arranged to determine which of the speed measurements to use; i.e. whether to use speed measurements determined by the GPS 402 or the IRS 404. The filter 406 comprises an algorithm arranged to process speed data from the GPS 402 and IRS 404 to determine whether to use a speed measurement provided by the GPS 402 or the speed measurement provided by the IRS 404 (or some combination of the two). For example, the filter 406 may comprise a Kalman filter.

In other examples, the speed determination system 400 may not include a filter but the monitoring system 100 described above may nevertheless determine that reliable speed data provided by the GPS 202 is unavailable; for example, when no GPS data is available, the SD 112 may exhibit the behaviour characteristic of the IRS 404.

The filter 406 outputs speed data (SD) 408 which, depending on the inputs to and parameters of the algorithm, may be based on speed data provided by the GPS 402, speed data provided by the IRS 404, or some combination of the two. In an example, the filter 406 filters out speed data provided by the GPS 402 when the GPS 402 is determined to be in error. For example, when there is no available GPS data or when the GPS data is otherwise determined to be unreliable (for example where there is insufficient or unreliable GPS data to determine an accurate speed measurement), the filter 406 may filter out speed measurements provided by the GPS 402 and provide speed data 408 provided by the IRS 404. Accordingly, when the SD 408 exhibits the behaviour characteristic of the IRS 404, it may be inferred that the GPS 402 is in an error condition.

The speed data 408 may be used by other systems of the aircraft. For example, the speed data 408 may be used to provide a groundspeed indication to the pilot via a display in the cockpit. In other examples, the speed data 408 may be used as an input to other aircraft navigation and/or control systems. For example, in-flight, the speed data 408 may be used by flight control systems or other hydraulic systems (such as ground spoilers, for example) or, for example, in-flight entertainment systems. At lower speeds (e.g. when the aircraft is on the ground) control systems of the aircraft may use the speed data 408 to determine, for example, whether to steer the aircraft using the control surfaces of the aircraft (e.g. the rudder) or by changing the angle of the nose wheel.

The speed data 408 provided to other systems of the aircraft by the speed determination system (i.e. that processed by the filter 406) typically does not provide any indication of the source of the speed data 408. That is, when other aircraft systems receive and use the speed data 408, they receive no indication as to whether the speed data 408 was provided based on a speed measurement from the GPS 402 or based on a speed measurement from the IRS 404 (or some combination of the two).

In some circumstances, it may be useful for an aircraft system to know the source of the speed data 408 provided by the speed determination system 108. For example, when the GPS 402 is in receipt of signals from an appropriate number of satellites speed measurements determined by the GPS 402 are typically more accurate than speed measurements determined by the IRS 404, because the speed measurements determined by the GPS 402 are not subject to the same cumulative errors as those of the IRS 404. In an example, it may be useful for a navigation system that uses the speed data 408 to know the source of the speed data 408 in order to determine an accuracy of navigation data that is generated on the basis of the speed data 408. In another example, it may be useful for a control system that uses the speed data 408 to know the source of the speed data 408 in order to determine a degree of control authority.

Figure 5:
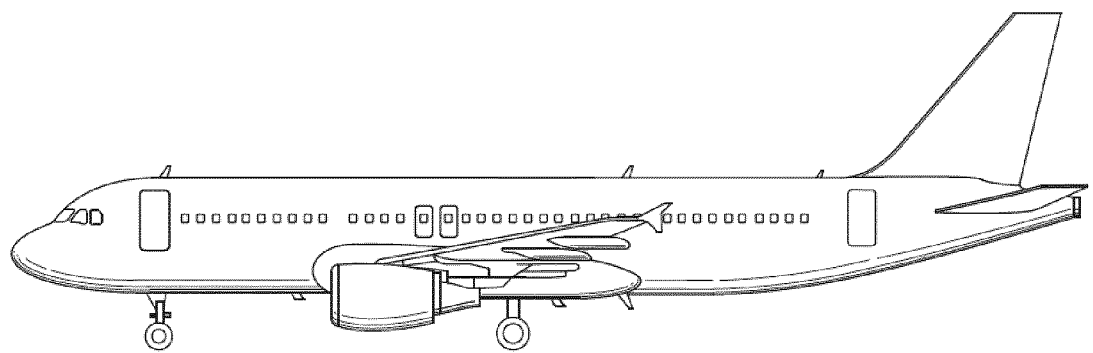
FIG. 5 is a schematic diagram of an aircraft according to an example.

In some embodiments, the monitoring system 100 described above with reference to FIG. 1a and FIG. 1b may be installed in an aircraft. Referring to FIG. 5, there is shown a schematic side view of an example of an aircraft 500 according to an embodiment of the invention. The aircraft 500 may comprise one or more monitoring systems such as the monitoring system 100 described above with reference to FIGS. 1a and 1b.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

It is to be noted that the term "or" as used herein is to be interpreted to mean "and/or", unless expressly stated otherwise.

The invention claimed is:

1. A monitoring system for a ground speed determination system in an aircraft, the ground speed determination system comprising a first speed measurement system and a second speed measurement system,
   wherein the first speed measurement system is arranged to determine a first time-varying ground speed measurement based on global positioning system data,
   wherein the second speed measurement system is arranged to determine a second time-varying speed measurement based on accelerometer data,
   wherein the second speed measurement system comprises an integrator and is associated with a predetermined behaviour characteristic comprising an error value, wherein the integrator amplifies the error value over time, and wherein the error value being a first value of a rate of change of acceleration,
   the monitoring system comprising a processor arranged to:
   receive ground speed data provided by the ground speed determination system;
   perform a correspondence determination process comprising
      processing the received ground speed data to determine a second value of a rate of change of acceleration indicated by the received ground speed data, and
      determining whether a correspondence condition is satisfied, the correspondence condition comprising a correspondence between the first value and the second value; and
   in response to determining that the correspondence condition is satisfied, determine that the first speed measurement system is in an error condition;
   determine corrected ground speed data for the aircraft using the second speed data and one or more correction values for the second speed measurement system; and,
   outputting an error signal indicating the error condition using an interface.

2. The monitoring system according to claim 1, wherein the monitoring system is arranged to monitor the predetermined behaviour characteristic to determine whether the behaviour characteristic corresponds with a behaviour characteristic exhibiting amplification.

3. The monitoring system according to claim 1, wherein the correspondence condition comprises that the second value lies within a predetermined range, the predetermined range including the first value.

4. The monitoring system according to claim 1, wherein the first value is 2.

5. A method of monitoring a ground speed determination system for an aircraft, the ground speed determination system being configured to determine the speed of an aircraft based on time-varying data provided by a plurality of speed measurement systems including a first speed measurement system and a second speed measurement system,
- wherein the first speed measurement system is arranged to determine a first time-varying ground speed measurement based on global positioning system data,
- wherein the second speed measurement system is arranged to determine a second time-varying ground speed measurement based on accelerometer data,
- wherein the second speed measurement system comprises an integrator and is associated with a predetermined behaviour characteristic comprising an error value, wherein the integrator amplifies the error value over time, and wherein the error value being a first value of a rate of change of acceleration, the method comprising:
- receiving ground speed data provided by the ground speed determination system;
- performing a correspondence determination process comprising
  - processing the received ground speed data to determine a second value of a rate of change of acceleration indication by the received ground speed data,
  - processing the received ground speed data to determine whether a correspondence condition is satisfied, the correspondence condition comprising a correspondence between the first value of a rate of change of acceleration and the second value of a rate of change of acceleration; and
- in response to determining that the correspondence condition is satisfied determining that the first speed measurement system is in an error condition;
- determining the corrected ground speed data for the aircraft using the second speed data and one or more correction values for the second speed measurement system; and,
- outputting an error signal indicating the error condition using an interface.

6. The method according to claim 5, wherein the correspondence condition comprises that the second value lies within a predetermined range, the predetermined range including the first value.

7. The method according to claim 5, wherein the first value is 2.

8. The method according to claim 5, wherein the speed data indicates a series of speed values corresponding to a respective series of time intervals, and the correspondence condition comprises that a correspondence between the first value and the second value persists over at least a predetermined number of the time intervals.

9. The method according to claim 8, wherein the predetermined number of time intervals is greater than or equal to five.

10. The method according to claim 8, wherein a duration of the time intervals is less than or equal to 200 ms.

11. The method according to claim 5, wherein the speed determination system is arranged to provide speed data based on the first speed measurement system when the first measurement system is not in an error condition.

12. The method according to claim 5, comprising:
- in response to determining that the first speed measurement system is not in an error condition, determining a speed of the aircraft from the first speed data and determining one or more correction values for the second speed measurement system; and
- in response to determining that the first speed measurement system is in an error condition, determining a speed of the aircraft from the second speed data and the determined one or more correction values.

13. An aircraft comprising a monitoring system according to claim 1.

14. A non-transitory computer-readable medium storing a monitoring program including instructions that, when executed by a processor in a ground speed determination system for an aircraft, causes the processor to execute a method;
- the ground speed determination system being configured to determine the ground speed of an aircraft based on time-varying data provided by a plurality of speed measurement systems including a first speed measurement system and a second speed measurement system,
- wherein the first speed measurement system being arranged to determine a first time-varying ground speed measurement based on global positioning system data,
- wherein the second speed measurement system arranged to determine a second time-varying speed measurement based on accelerometer data,
- wherein the second measurement system comprises an integrator and is associated with a predetermined behaviour characteristic comprising an error value, wherein the integrator amplifies the error value over time, and wherein the error value being a first value of a rate of change of acceleration, and wherein the method comprises:
- receiving ground speed data provided by the ground speed determination system;
- performing a correspondence determination process comprising
  - processing the received ground data to determine a second value of a rate of change of acceleration indicated by the received ground speed data,
  - processing the received ground speed data to determine whether a correspondence condition is satisfied, the correspondence condition comprising a correspondence between the first value of a rate of change of acceleration and the second value of a rate of change of acceleration;
- in response to determining that the correspondence condition is satisfied, determine that the first speed measurement system is in an error condition;
- determine corrected ground speed data for the aircraft using the second speed data and one or more correction values for the second speed measurement system; and,
- outputting an error signal indicating the error condition using an interface.

* * * * *